UNITED STATES PATENT OFFICE.

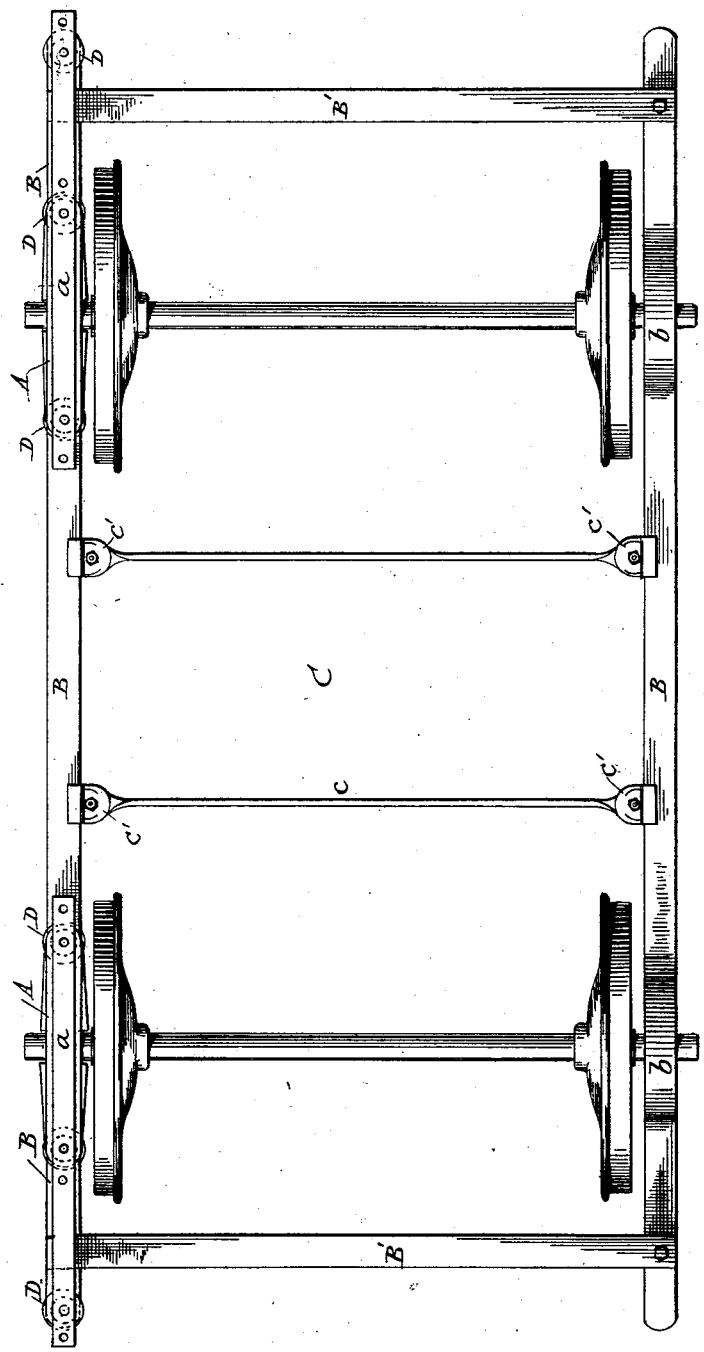

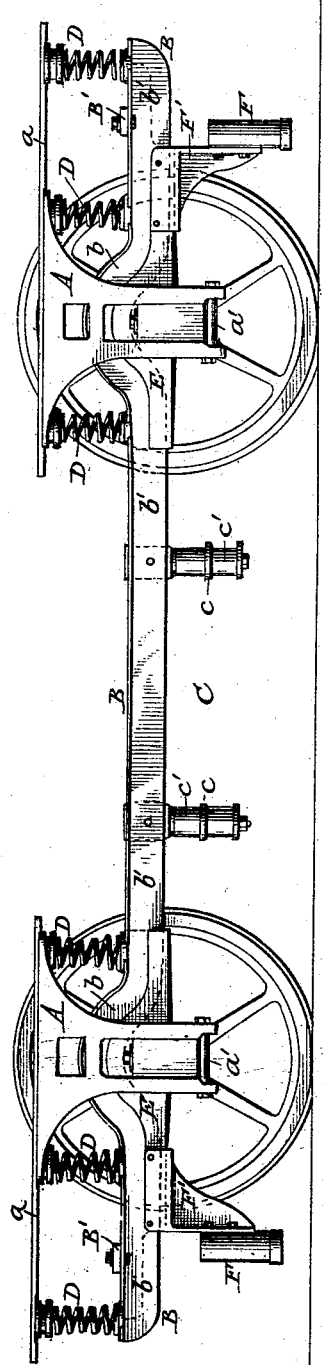

WILLIAM S. G. BAKER, OF BALTIMORE, MARYLAND.

CAR-TRUCK.

SPECIFICATION forming part of Letters Patent No. 509,355, dated November 28, 1893.

Application filed November 15, 1892. Serial No. 452,022. (No model.)

*To all whom it may concern:*

Be it known that I, WILLIAM S. G. BAKER, a citizen of the United States, residing in Baltimore, in the State of Maryland, have invented certain new and useful Improvements in Car-Trucks, of which the following is a specification.

My present invention relates particularly to that class of car trucks in which a frame is carried by the axles or axle boxes to support motors or grip mechanism. In the most approved trucks of this class, the car body is connected to the truck frame by springs, while the motor or grip-carrying frame is connected to the axle boxes to move with them independently of any movement of the car body. The advantages of such a construction are now well known and need not be enumerated. A car truck of this character is shown in my Patent No. 399,468, of March 12, 1889.

The object of my present invention is to provide a truck of this class that shall combine the requisite strength and durability with a minimum weight, and that may be readily manufactured, put together and taken apart.

In the accompanying drawings,—Figure 1 is a plan view of my improved truck. Fig. 2 is a side elevation. Fig. 3 is a detail view of a portion of one of the side beams of the motor or grip frame. Fig. 4 is a detail view of one of the yokes or seats for the side beam. Fig. 5 is a section on the line 5—5 of Fig. 4.

The pedestals A are provided with frame bars $a$, which should be secured to the car body. Below the axle boxes, cross bolts $a'$ are secured to the pedestals, and these are readily removable to permit the wheels, axles and axle boxes to be conveniently removed without disturbing other parts of the truck.

On each side of the truck, I employ a side frame piece or side beam B, made in one piece and extending from one end of the truck to the other over the axle boxes. Near the ends the two side beams are connected by cross pieces B'.

Between the axles, I provide a frame C, comprising cross bars $c$, secured to hangers $c'$, fixed to the side beams B. This frame may be conveniently employed for supporting the electric motor or motors. The frame may be suitably modified or a proper frame may be located between the axles for supporting other motors or grip mechanism.

The side beams B, are each made of a single piece of metal, preferably T-shaped, and rolled or formed to the proper shape. Where the beams cross the axles, they are formed with curved yokes $b$, in order that they may cross the axle boxes without being reduced in size, and that the main portions of the beams on each side of the axle boxes may be below the level of the tops of the boxes in order to accommodate the springs. The yokes or curved portions may, however, be omitted, and the pedestals made longer and the car body raised sufficiently, or the springs may be made shorter, but I prefer the construction shown.

The horizontal portion of the T-beam constitutes the top of the beam and the springs D, on opposite sides of the pedestals are arranged in seats in the horizontal or flat portion of the beam. As the vertical portion $b'$ of the beam is narrow, instead of mounting it directly on the axle boxes, I provide yokes or saddles E, which I interpose between the boxes and the T-beams. The yokes are suitably formed to embrace the upper portions of the axle boxes, and are provided with recesses and flanges $e$ $e'$ $e^2$, to fit the T-beams, the vertical portions of which are secured to the flanges $e'$ by bolts $e^3$. The yokes are provided with curved seats on their upper sides corresponding with the curved under sides of the yokes or curved portions $b$, of the side beams, in order that the side beams may rock transversely across the axle boxes to a slight degree to relieve the strain which might sometimes otherwise occur. Life-guards F, at each end of the truck are secured to the yokes F, by brackets or hangers F'. The frame thus constructed is made up of but few parts. It is strong and durable and takes up but little room. Its weight is not so great as to be objectionable. A minimum number of bolts is employed and there is no rattling or shaking loose of the component parts.

I claim as my invention—

1. The combination, substantially as hereinbefore set forth, with the wheels, axles, and axle boxes, of a frame comprising T-beams suitably connected together, and yokes or saddles resting on the axle boxes over which the T-beams extend and to which they are secured.

2. The combination, substantially as hereinbefore set forth, with the wheels, axles and axle boxes, of a frame comprising T-beams, suitably connected together, supporting springs mounted on the flat, upper portions of the T-beams, yokes or saddles secured to the vertical portions of the T-beams, and arranged under curved or bent portions thereof.

3. The combination, substantially as hereinbefore set forth, with the wheels, axles and axle boxes, of a frame comprising side beams suitably connected together, yokes resting on the axle boxes, over which the side beams extend, and on which they are supported, and life guards secured to hangers depending from the yokes.

4. The combination, with the wheels, axles and axle boxes, of a frame having T-shaped side beams, and yokes flanged and recessed as described, removably secured to the side beams and resting on the axle boxes.

5. The combination, substantially as hereinbefore set forth, with the wheels, axles and axle boxes, of a frame comprising side beams suitably connected together and formed with curved portions extending over the axle boxes, yokes or saddles resting on the axle boxes over which the side beams extend, and which have curved seats for the curved portions of the side beams.

In testimony whereof I have hereunto subscribed my name.

WILLIAM S. G. BAKER.

Witnesses:
J. PAUL BAKER,
C. W. KOHLMANN.